United States Patent
Fahlenkamp et al.

(10) Patent No.: US 7,394,669 B2
(45) Date of Patent: Jul. 1, 2008

(54) SWITCHING MODE POWER SUPPLIES

(75) Inventors: Marc Fahlenkamp, Geretsried (DE); Xiao Wu Gong, Singapore (SG); Harald Zoellinger, Singapore (SG)

(73) Assignee: Infineon Technologies AG, Munich (DE)

( * ) Notice: Subject to any disclaimer, the term of this patent is extended or adjusted under 35 U.S.C. 154(b) by 206 days.

(21) Appl. No.: 10/529,615

(22) PCT Filed: Apr. 17, 2003

(86) PCT No.: PCT/SG03/00091

§ 371 (c)(1),
(2), (4) Date: Mar. 30, 2005

(87) PCT Pub. No.: WO2004/030194

PCT Pub. Date: Apr. 8, 2004

(65) Prior Publication Data

US 2006/0044845 A1    Mar. 2, 2006

(30) Foreign Application Priority Data

Sep. 30, 2002    (SG) ............................. 200205929-3

(51) Int. Cl.
*H02M 3/335* (2006.01)

(52) U.S. Cl. ............... 363/21.15; 363/21.16; 363/21.18; 363/97

(58) Field of Classification Search ............. 363/21.05, 363/21.07–21.11, 21.15, 21.16, 21.18, 56.1, 363/56.11, 97
See application file for complete search history.

(56) References Cited

U.S. PATENT DOCUMENTS 4,330,816 A * 5/1982 Imazeki et al. ........... 363/21.05
5,029,269 A * 7/1991 Elliott et al. ............... 363/21.1

(Continued)

FOREIGN PATENT DOCUMENTS

EP    0 525 652    7/1992

(Continued)

OTHER PUBLICATIONS

"Switch Mode Power Supply Controller", SGS-Thomson Microelectronics, Jun. 1992 (8 pages).

(Continued)

*Primary Examiner*—Jeffrey L. Sterrett
*Assistant Examiner*—Stuart Hansen
(74) *Attorney, Agent, or Firm*—Maginot, Moore & Beck (57) ABSTRACT

In a switching mode power supply, an input received from the secondary side of the transformer 7 and indicative of the power being drawn by the loads is used to control the timing of bursts. The input is compared with two threshold different threshold values V2, V3, and switching is enabled if the input rises above a first higher threshold value V2, and disabled if it falls below a second lower threshold value V3. A memory device FF1 controls a current limitation circuit which limits currents in the primary of the transformer when the switching mode power supply is operating in the burst mode.

19 Claims, 8 Drawing Sheets

U.S. PATENT DOCUMENTS

| | | | |
|---|---|---|---|
| 5,297,014 A * | 3/1994 | Saito et al. | 363/21.17 |
| 5,703,764 A | 12/1997 | Hermann et al. | |
| 6,061,257 A * | 5/2000 | Spampinato et al. | 363/21.13 |
| 6,134,123 A * | 10/2000 | Yamada | 363/21.13 |
| 6,271,701 B1 * | 8/2001 | DiTommaso | 327/210 |
| 6,324,082 B1 | 11/2001 | Keller | |
| 6,385,061 B1 | 5/2002 | Turchi et al. | |
| 6,519,165 B2 * | 2/2003 | Koike | 363/21.12 |
| 6,538,419 B1 * | 3/2003 | Allen et al. | 323/285 |
| 6,563,720 B2 * | 5/2003 | Kitano | 363/21.15 |
| 6,674,656 B1 * | 1/2004 | Yang et al. | 363/21.1 |
| 2002/0067629 A1 | 6/2002 | Koike | |

FOREIGN PATENT DOCUMENTS

| | | |
|---|---|---|
| EP | 0942 518 A2 | 9/1999 |
| EP | 1179 884 A2 | 2/2002 |
| WO | WO 99/07062 | 2/1999 |
| WO | WO 00/70730 | 11/2000 |

OTHER PUBLICATIONS

"Integrated Circuits XP-002250698 Data Sheet", TEA 1507 GreenChip™ SMPS Control IC, Phillips Semiconductors, Philips, Dec. 5, 2000, pp. 1-20 (20 pages).

"PWM Current-Mode Controller for Universal Off-Line Supplies Featuring Standby and Short Circuit Protection", XP-002250699 NCP1203, Semiconductor Components Industries, LLC, Feb. 2003, pp. 1-14 (14 pages).

"Application Note 4116 A Fairchild Power Switch (FPS) based on Switched Mode Power Supply for LCD Monitor Use", Fairchild Semiconductor Corporation, © 2001, pp. 1-12 (12 pages).

* cited by examiner

SWITCHING MODE POWER SUPPLIES

FIELD OF THE INVENTION

The present invention relates to switching mode power supplies (SMPS), and in particular to a control circuit for a SMPS, to a SMPS itself, to apparatus powered by and incorporating the SMPS and to methods performed by the SMPS and the control circuit.

BACKGROUND OF THE INVENTION

Switching mode power supplies are being increasingly used in many domestic and industrial applications. Apparatus such as televisions or computer monitors operate in one of a number of states or modes. For example, a first "off" mode occurs when there is no power being supplied to the apparatus; a second "on" mode occurs when the device is switched on and operating normally; and a third mode, referred to as a "standby mode", occurs when the device is to remain powered but with reduced functions and reduced power consumption. In the case that the apparatus is a television, for example, the standby mode may, for example, be a mode in which the television is not displaying a picture or producing sound, but certain circuitry in the television remains powered so that, if the "on" button of the remote control is pressed the television will return to the "on" mode.

SMPS are implemented by supplying a regulated power supply to a the primary side of a transformer in series with a transistor. The secondary side of the transformer is connected to the apparatus ("load"). Switching of the transistor (usually, but not exclusively, switching off of the transistor; so called "fly-back" operation) causes variations in the current through the transformer, resulting in an output power on the secondary side of the transistor. The secondary side of the transformer is connected via a smoothing circuit to the apparatus to be powered. The average number of switching operations per unit time, and the current caused to flow in the transistor in each switching operation, together determine the average power transmitted to the apparatus. The main advantage of SMPS in comparison to conventional power supplies built up by means of linear regulators is their high efficiency at full load.

However, when the load decreases and the switching cycle remains the same, the efficiency of the SMPS decreases tremendously, since power losses are almost entirely due to the switching losses, which in turn are almost exactly proportional to the number of switching operations the transistor performs. A known solution to this problem is to reduce the number of switching operations per unit time as the load falls, such that the average number of switching operations is sufficient to supply the load. Since the number of switching operations is reduced, the switching losses decrease as the load is reduced.

There are several known methods for controlling the timing of the switching operations.

One solution is "frequency reduction", in which in a given mode the switching operations on the transistor are periodic with a frequency substantially proportional to the power to be supplied to the load in that mode. Thus, in modes for which the power consumption of the load is low, the frequency of the switching operation is low, and thus the switching losses are low. Such a solution is described for example in the document "Data sheet TEA 1507", published by Philips on 5 Dec. 2000. A disadvantage of this technique is that if the frequency of the switching operations decreases into the audible range, an audible noise is generated by the transformer.

Another solution is to maintain the frequency of the switching operations at the same value irrespective of whether the device is operating in high or low power mode, but in the low power mode to interrupt the switching operations. Thus, in this "burst mode" there are "bursts" ("frames") of high frequency power pulses separated by periods in which there are no power pulses at all. The average power transmitted thus depends upon the proportion of the operation of the SMPS for which the bursts are transmitted. Such techniques too are described in the TEA1507 document. U.S. Pat. No. 6,392,06 also describes such a concept. The burst mode is entered by a signal generated from the secondary side of the transformer, and transmitted to the primary side by an optocoupler. Once, the burst mode is entered, the timing of the bursts is determined by a measurement of a voltage ("undervoltage") on the primary side. This is known as "undervoltage lockout". A disadvantage of this technique is that if the load rises during one of the periods between bursts then the circuit cannot react until the next burst is reached.

Another known technique is to control the burst mode based on a Vcc signal derived from a winding on the transformer. This is employed in the FS6Series of Fairchild (see, for example, application note 4116 published by Fairchild Semiconductor Corporation). The burst mode is entered if a feedback signal obtained from the secondary side of the transformer is kept below a certain level. The disadvantage with this is that the control is mainly taken over by the Vcc and therefore not directly load dependent.

Another known technique, employed in U.S. Pat. No. 6,385,061B1 and in the NCP1203 system of Semiconductor Component Industries LLC, is to start the burst mode when the load is below a certain level. The disadvantage of this concept is that there is no hysteresis implemented between the normal operation mode and the burst mode. Therefore, high frequency turning on and off of the burst mode (high frequency "bursting") can occur if the changes around this level become small, and this too can lead to a disadvantageous audible noise.

SUMMARY OF THE INVENTION

A first aspect of the present invention proposes in general terms that an input received from the secondary side of the transformer and indicative of the power being drawn by the load is used to control the timing of bursts. The input is compared with two different threshold values, and the burst mode is switched on if the input rises above a first higher threshold value, and switched off if it falls below a second lower threshold value.

The invention thus makes it possible to determine the duty cycle and the frequency of a burst mode only from a feedback signal which contains the load information from the SMPS. The difference between the two threshold values gives a hysteresis, which removes high frequency bursting.

Specifically, one expression of the first aspect of the invention is a switching mode power supply having a transformer, a transistor controlling the current through the primary of the transformer, and a control unit for controlling the switching of the transformer to generate current pulses in the transformer, the control unit being arranged to receive a signal from the secondary side of the transformer and compare it with two threshold levels defining a range, the control unit enabling switching of the transistor in the case that the signal is outside the range in a first direction, and disabling switching of the transistor in the case that the signal is outside the range in a second direction.

In a second aspect, the present invention proposes in general terms that a measurement is made indicative of the current through the gate, and that in the burst mode the switching of the transistor is controlled to limit this current.

The second aspect of the invention is motivated by an observation that, irrespective of the bursting frequency, noise may be generated in the transformer if the current which flows through it is too great.

Specifically, one expression of the second aspect of the invention is a switching mode power supply having a transformer, a transistor controlling the current through the primary of the transformer, a control unit for controlling the switching of the transformer to generate current pulses in the transformer, a memory device for storing data indicating whether the switching mode power supply is operating in a certain power supply mode, and a current limitation circuit arranged to receive a signal indicative of the current through the primary of the transformer and to limit the current pulse if the signal indicates that the current is above a threshold value and the memory device indicates that the switching mode power supply is operating in said power supply mode.

BRIEF DESCRIPTION OF THE FIGURES

Further preferred features of the invention will now be described for the sake of example only with reference to the following figures, in which:

FIG. 2 (a) shows a preferred implementation of the second embodiment of the invention in which the signal is directly related to the power drawn by the load;

FIG. 2 (b) shows an alternate implementation of the second embodiment of the invention of FIG. 2 (a) in which the signal is inversely related to the power drawn by the load;

DETAILED DESCRIPTION OF THE EMBODIMENTS

Figure 1:
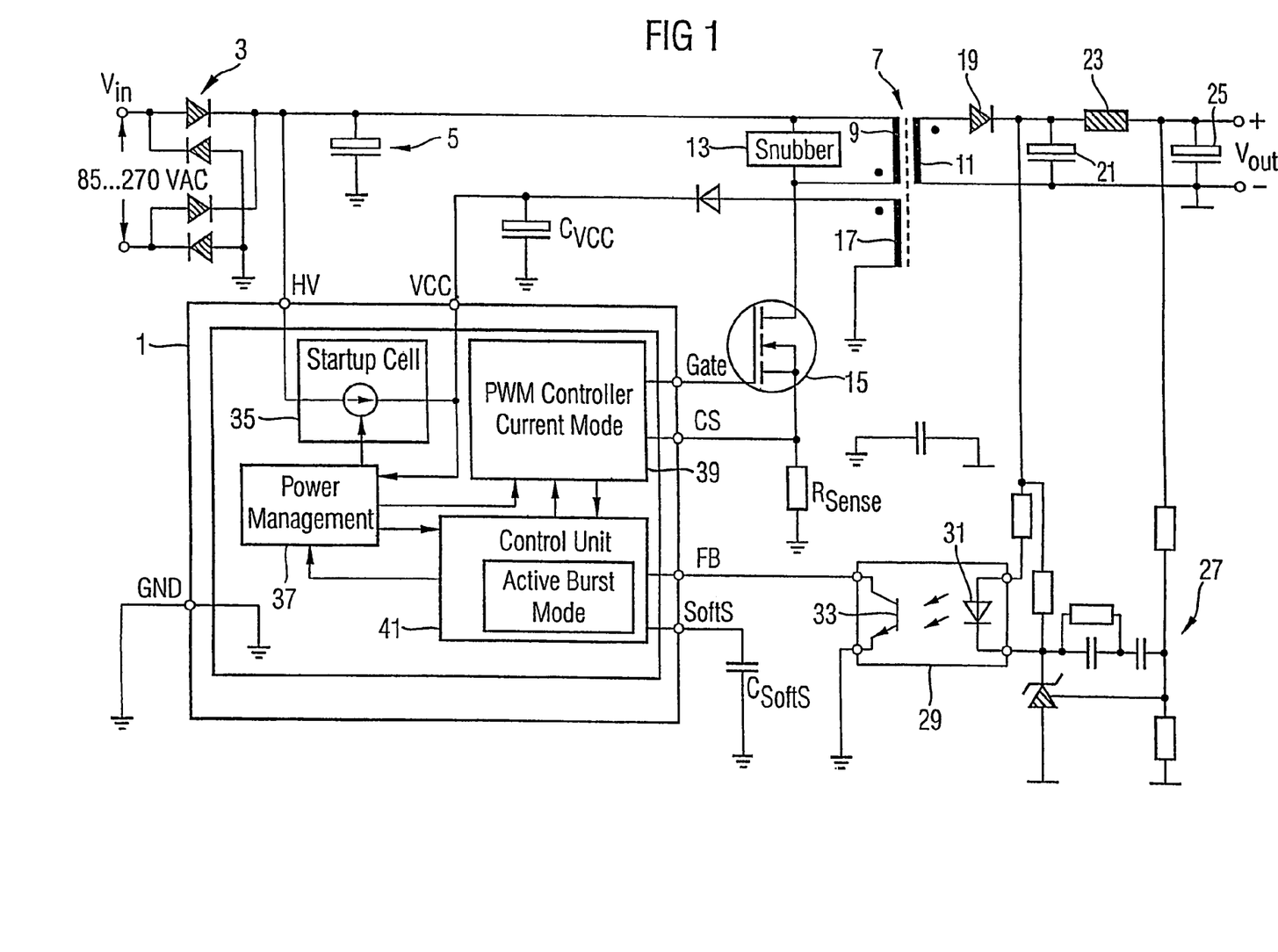
FIG. 1 shows a circuit diagram of a first embodiment of the invention.

FIG. 1 shows schematically a power converter which is a first embodiment of the invention. An AC voltage supply Vin is received at the left of the figure. Typically Vin is in the range 85 to 270V. It is rectified by a rectifier 3, and then passed to a smoothing capacitor 5. The DC voltage thus generated is fed to one input of a transformer 7 having a primary winding 9 and a secondary winding 11. A snubber 13 is connected between the two inputs of the primary winding 9, and the other common connection of the snubber 13 and primary winding 9 is connected to an input of a transistor 15. The gate of the transistor 15 is controlled by an output called "Gate" of a control system 1. The other side of the transistor 15 is connected to ground via a resistor $R_{sense}$. The voltage at one side of the resistor $R_{sense}$ is an input CS to the control system 1. The control system 1 further receives an input HV from the rectifier 3 for powering the unit 1. When in standby mode, the input HV serves as a current source that can be switched off for current conservation. The control system 1 also receives an input $V_{cc}$ from one side of an additional winding 17, other side of winding 17 being connected to ground. The input $V_{cc}$ is smoothed by a capacitor $C_{Vcc}$.

The secondary winding 11 of the transformer 7 is connected via a diode 19 across a p-filter, formed by smoothing capacitors 21 and 25 and an inductor 23, to give a DC voltage output $V_{out}$. The secondary side of the transformer 7 is further provided with circuitry 27 of a conventional design (described for example in the reference U.S. Pat. No. 6,385,061), including an optocoupler 29, in which current through a light emitting diode 31 is detected by a light sensitive element 33, which is connected between ground and a signal input FB of the control system 1.

The control system 1 further includes a connection GND to ground, and a connection SoftS to ground via a capacitor $C_{softS}$.

The control system 1 includes the following units: a start-up cell 35 connected to HV and providing current to Vcc. A power management unit 37, controlling the startup cell 35 and receiving the signal Vcc. A pulse width modulator (PWM) 39, receiving the input CS and generating the output Gate, and a control unit 41. The control unit 41 receives an input from the power management unit 37 and the PWM unit 39, and transmits outputs to the PWM unit 39 and power management unit 37.

Low load conditions at VOUT can be detected by the feedback signal FB, as described in U.S. Pat. No. 6,385,061. As described below, a first comparator in the control unit 41 receives the input FB and provides such detection by comparing FB with a fixed voltage level.

In U.S. Pat. No. 6,385,061 cycles are skipped (i.e. there is a pause between bursts) by blocking the PWM if FB is below a certain voltage threshold, and if the FB is above this threshold the PWM is no longer blocked. By contrast, in the present invention, the control unit 41 includes in addition to the comparator for detecting low load conditions (i.e. a comparator which detects if FB is below a given level and in this case blocks the effect of the PWM 39, for example by switching off the bias which the PWM modulates and applies to the gate of the transistor 15), a second comparator which also receives FB and detects whether FB exceeds a second higher threshold level. If this is true, then the PWM is activated again. Therefore a hysteresis is implemented using the two comparators, one for switching off the bias and one for switching on the bias. The bias is provided to sinks and sources which can be implemented using current mirrors for powering the control unit 101 and can switch off the internal current supply of the sub-blocks.

By switching off the bias the current consumption of the control system can be reduced. This is preferable since during the time that the PWM 39 is blocked there is no self-supply for the Vcc, and the monitoring unit 1 relies for power supply on the reserve in the capacitor $C_{Vcc}$. Therefore reducing the current consumption helps to reduce the required size of the capacitor $C_{vcc}$.

The frequency and duty cycle of the frames (bursts) during the burst mode depend on the load conditions and the spacing of the thresholds V2, V3. This is in contrast to the burst mode described in U.S. Pat. No. 6,385,061, and in the embodiment of FIG. 1 the lowest reachable frequency for the frames is much lower.

Once the burst mode is activated, current limiting is applied to ensure that the current through the transistor 15 never rises above a predetermined level (the second aspect of the invention). This is to avoid audible noise being generated in the transformer due to the high current within the frames (bursts)

of the burst mode. A third comparator is provided which also receives FB as an input, and which upon the load rising turns off the current limiting.

Figure 2A:
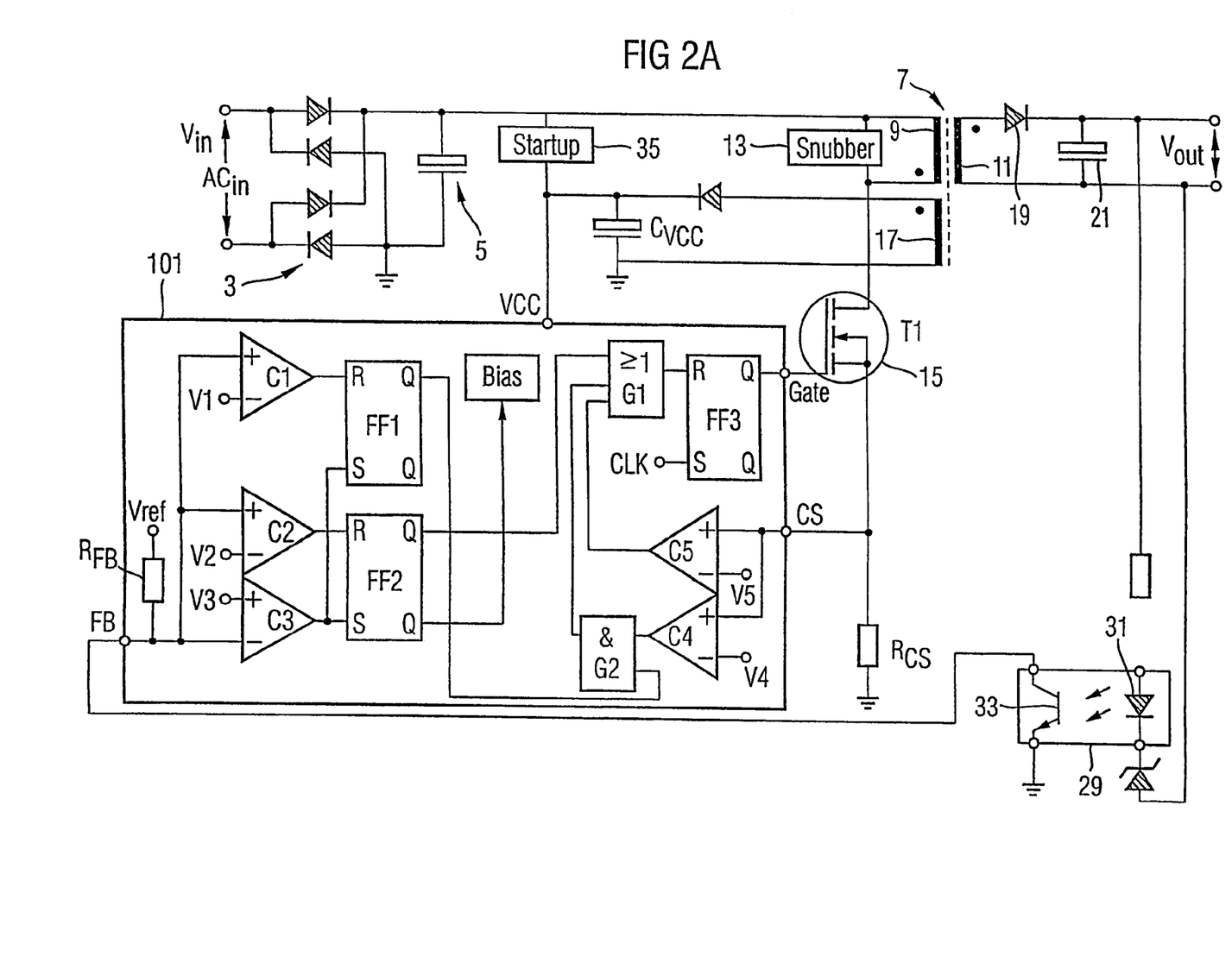

These features are better understood from FIG. 2 (a), which is a diagram of a second embodiment of the invention. Portions of the embodiment which are the same as components of the first embodiment are given the same reference numerals and not otherwise described. In this case the control system 1 is replaced by a control unit 101 (except that the conventional start-up cell 35 is provided separately. The control unit 101 can be implemented as a single integrated circuit logic device.

The control unit 101, like the control system 1, draws its power from the $V_{cc}$ input (the ground terminal of the control unit 101 is omitted from FIG. 2 (a) for simplicity). The control unit 101 receives only two control inputs: CS, which is indicative of the current through the transistor 15 and the primary winding 9 of the transformer 7, and FB obtained from the secondary side of the transformer 7 through the optocoupler 29. The input FB is fed to two comparators C2, C3, which each also receive a respective threshold voltage V2, V3. The outputs of the comparators C2 and C3 are used to control the timing of the bursts in the burst mode as described below. A first flip-flop FF2 receives their outputs, and uses them to control the bias.

The output of the FF2 is further transmitted via a logic gate G1 to a flip-flop 3 which further receives the clock signal CLK. The output of the FF3 is the control signal Gate for the transistor 15. Thus, the transistor 15 is switched in dependence on the clock signal CLK (which provides the switching at a high regular frequency, and thus plays the role of the PWM of FIG. 1) and the input to FF1 from the logic gate 1 which in the burst mode inhibits the switching.

Figure 2B:
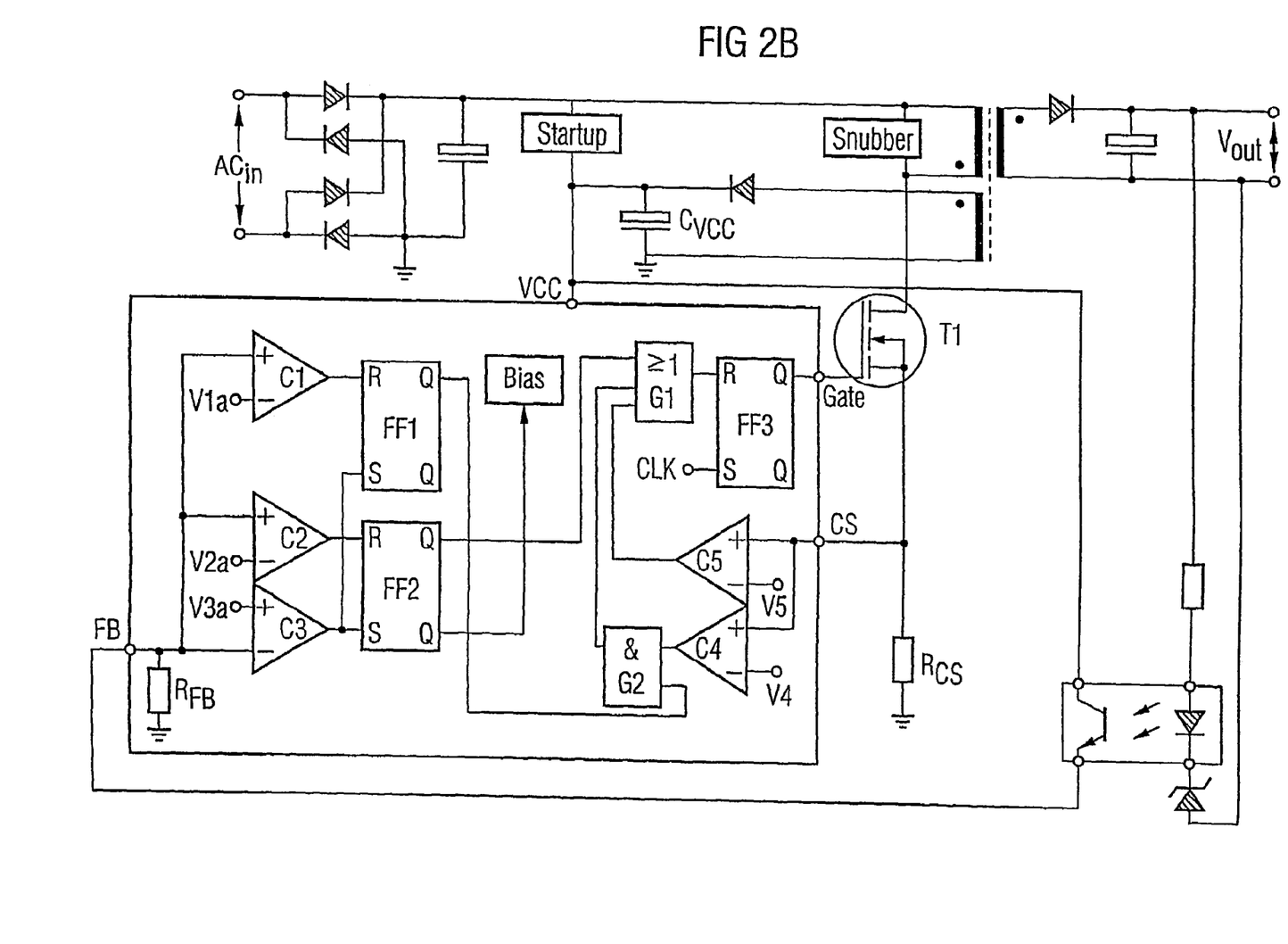

FIG. 2 (a) illustrates an embodiment in which the feedback signal is directly related to the power drawn by the load. FIG. 2 (b) shows an alternate implementation of the second embodiment of the invention of FIG. 2 (a) in which the feedback signal is inversely related to the power drawn by the load. If the power consumption at Vout is decreasing, VFB (the feedback voltage) is increasing, and visa versa. Therefore, the relationship between the threshold voltages V1a, V2a and V3a is the inverse of the thresholds V1, V2 and V3 of the implementation of FIG. 2 (a) where the feedback signal is directly related to the power drawn by the load. The relationship is V3a>V2a>V1a. This same implementation method can be applied to circuits of FIGS. 6 and 7 described below. The signal curve for VFB is the inverse of those shown in FIGS. 3, 5 and 8 below. In the implementation of FIG. 2 (b), RFB (the feedback resistance) is acting as a pull-down resistor that can also be replaced by an active current sink.

Figure 3:
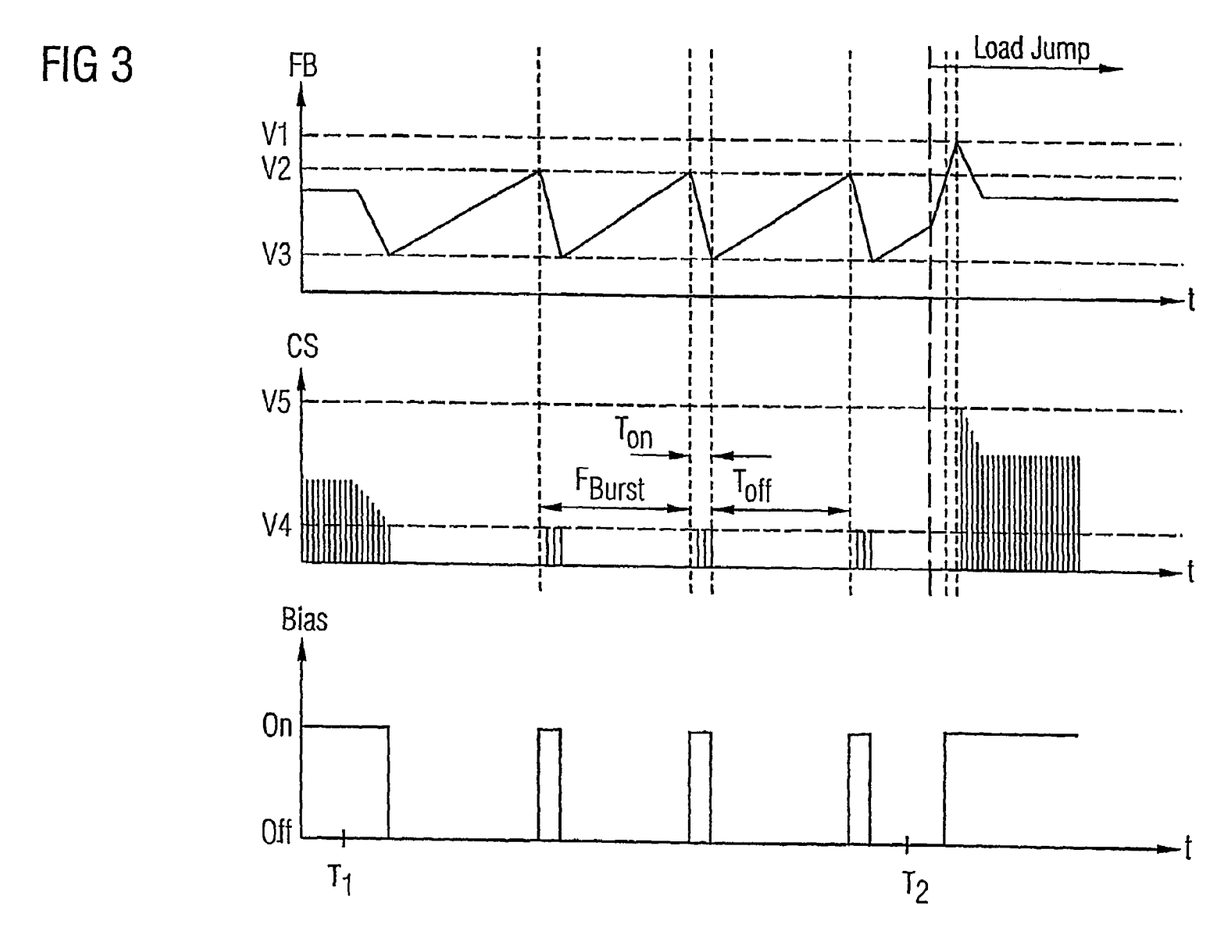
FIG. 3 shows waveforms observed in the embodiment of FIG. 2 (a)

The performance of the device will now be described with reference to FIG. 3, which shows the variation of FB, CS and bias voltage as a function of time. Initially the load is high enough that the burst mode is not entered. At time $T_1$ the load falls such that burst mode operation should be applied, but at a time $T_2$ the load jumps back to a high level.

In the case of low load, whenever FB decreases below V3 (e.g. at time $T_1$), the flip-flop FF2 immediately blocks the Gate signal via gate G1 and flip-flop FF3 and switches off the bias. As there is no longer PWM switching, $V_{out}$ decreases and causes FB to rise. If FB exceeds V2, FF2 is reset by the comparator C2 to switch on the bias and to release G1. The clock signal CLK can now start the switching cycle by setting FF3. If the load it still low, FB decreases again below the threshold V3 and deactivates the bias again. Thus, there is a burst of spikes in the periods shown as $T_{on}$ during which FB is decreasing between V2 and V3, and then no spikes during the periods $T_{off}$ in which FB is rising from V3 to V2. The frequency of the bursts $F_{burst}$ is the reciprocal of $T_{on}+T_{off}$.

The voltage FB is also transmitted to a comparator C1, which further receives a threshold voltage V1 which is higher than both V2 and V3. The passage of FB above V1 indicates that the burst mode is ended. A flip flop FF1 stores the value output from the comparator C1 until this is reset by the comparator C1. Thus, the output of FF1 is a signal indicating whether the burst mode is currently being operated.

Note that in this embodiment this signal is not transmitted directly to the gate G1. Instead, the output of FF1 is used as an input to a system at the lower right of the control unit 101 including a first comparator C4 which compares the input CS to a threshold voltage level V4, and transmits the output to the logic gate G2.

Thus, at the same time that the C2 controls the flip-flop FF2 to block the PWM, it allows the FF1 to release the output of C1, which in turn allows the gate G2 to release the output of the comparator C4.

Figure 4:
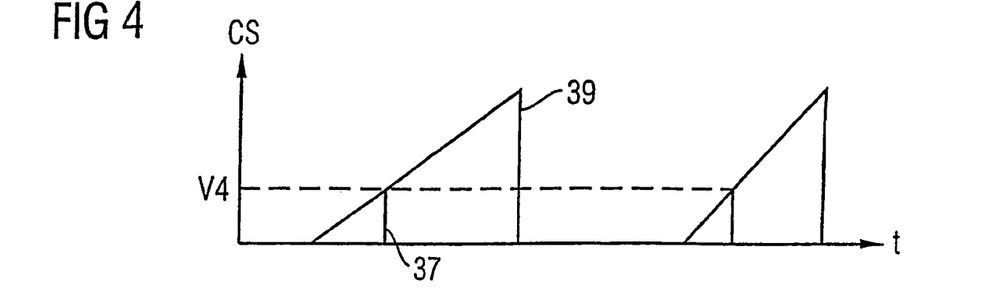
FIG. 4 shows the profiles of current spikes in the embodiment of FIG. 2 (a)

In other words, logic gate G2 outputs an input to the logic gate G1 in the case that the comparator C4 finds that the CS indicates that the current through the transistor is above a predetermined level (a level such that CS is at least V4) and the FF1 indicates that the power converter is operating in the burst mode. In the case that both of these are true, the output of the gate G1 has the effect of turning off the current through the transistor 15. This is illustrated in FIG. 4, which shows the profile of a single triangular current spike in the burst mode (line 37), in comparison to a single triangular current spike (line 39) when the burst mode is not being operated. When the current rises above V4 in the burst mode, it is promptly shut-off by turning the transistor 15 off.

If there is a load jump, as at time $T_2$, FB will immediately exceed V2 and then rise further, since due to the current limiting performed by the comparator C4, the current provided is not sufficient for the sudden power demand. If FB exceeds V1, FF1 is reset, and the output of the comparator C4 is blocked by G2. In this case the maximum current is limited by the comparator C5 which compares CS with a second threshold V5 (higher than V4), and shuts off the current when CS is above V5. A high power is therefore delivered to the load very promptly. A comparator with the function of C5 is known from U.S. Pat. No. 6,385,061.

The device then enters a normal operating mode (as in conventional systems) in which FB does not fall below V3, so the burst mode is not re-entered (until the load drops again).

Figure 5A:
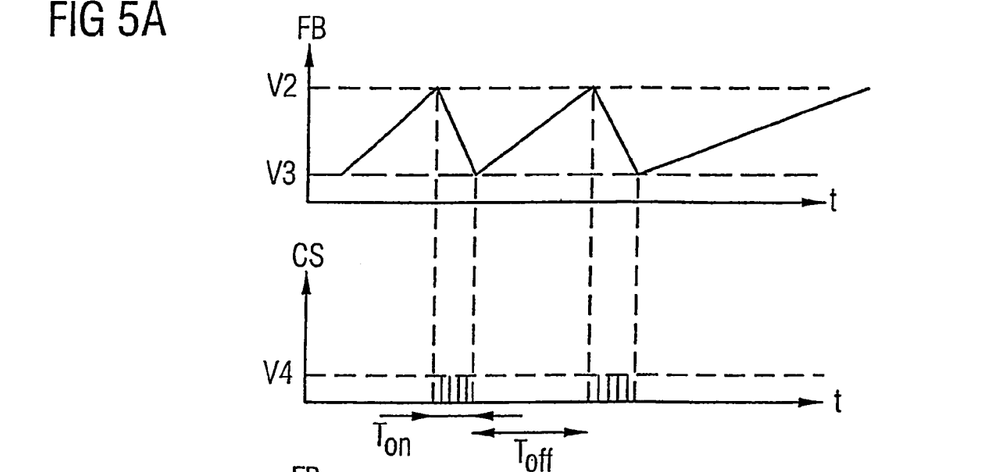
FIG. 5, which is composed of FIGS. 5(a)-5(c), illustrates the variation of burst frequency with load in the embodiment of FIG. 2 (a)
Figure 5B:
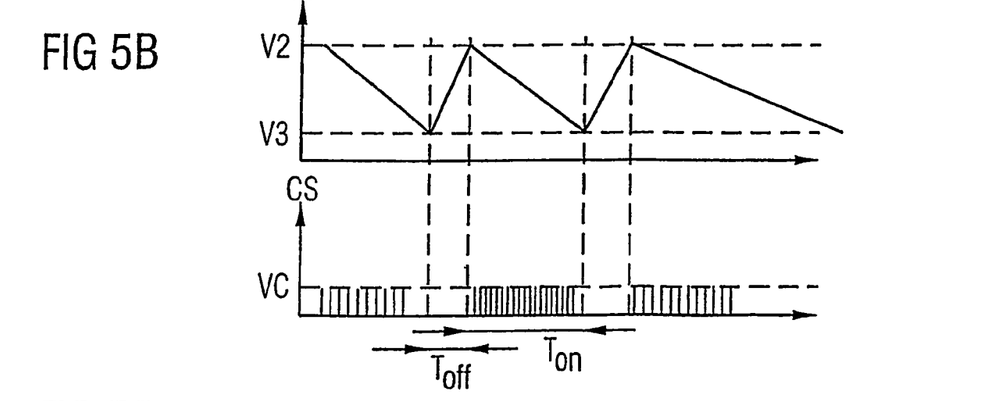
Figure 5C:
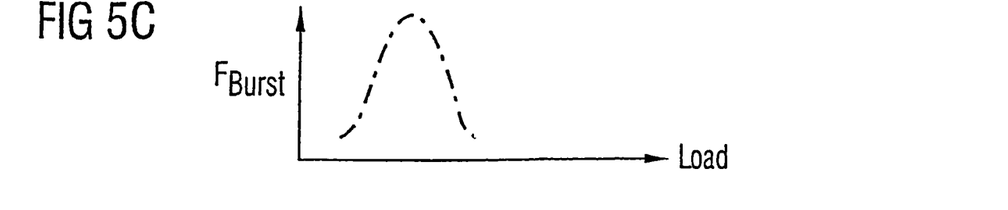

Note that, due to the hysteresis provided by the comparators C2 and C3, when the device is operating in the burst mode the bursts have the highly desirable property shown in FIGS. 5(a)-5(b). The upper part of FIG. 5(a) shows the profile of FB in a low load state, while the lower part of FIG. 5(a) shows the corresponding pattern of spikes. The upper part of FIG. 5(b) shows the profile of FB in a high load state, while the lower part of FIG. 5(b) shows the corresponding pattern of spikes. Although the duty cycles of the spikes in the lower parts of FIG. 5(a) and FIG. 5(b) are different, they have the same fundamental frequency, $f_{Burst}$. FIG. 5(c) shows a plot $f_{Burst}$ against load, and demonstrates that $f_{Burst}$ rises to a maximum and then falls. This is in contrast to the system shown in U.S. Pat. No. 6,385,061 (which employs only a single comparator), since there as the load rises $f_{Burst}$ rises too, to the point at which it enters the audible range, at which point an unpleasant audible noise may be generated.

Figure 6:
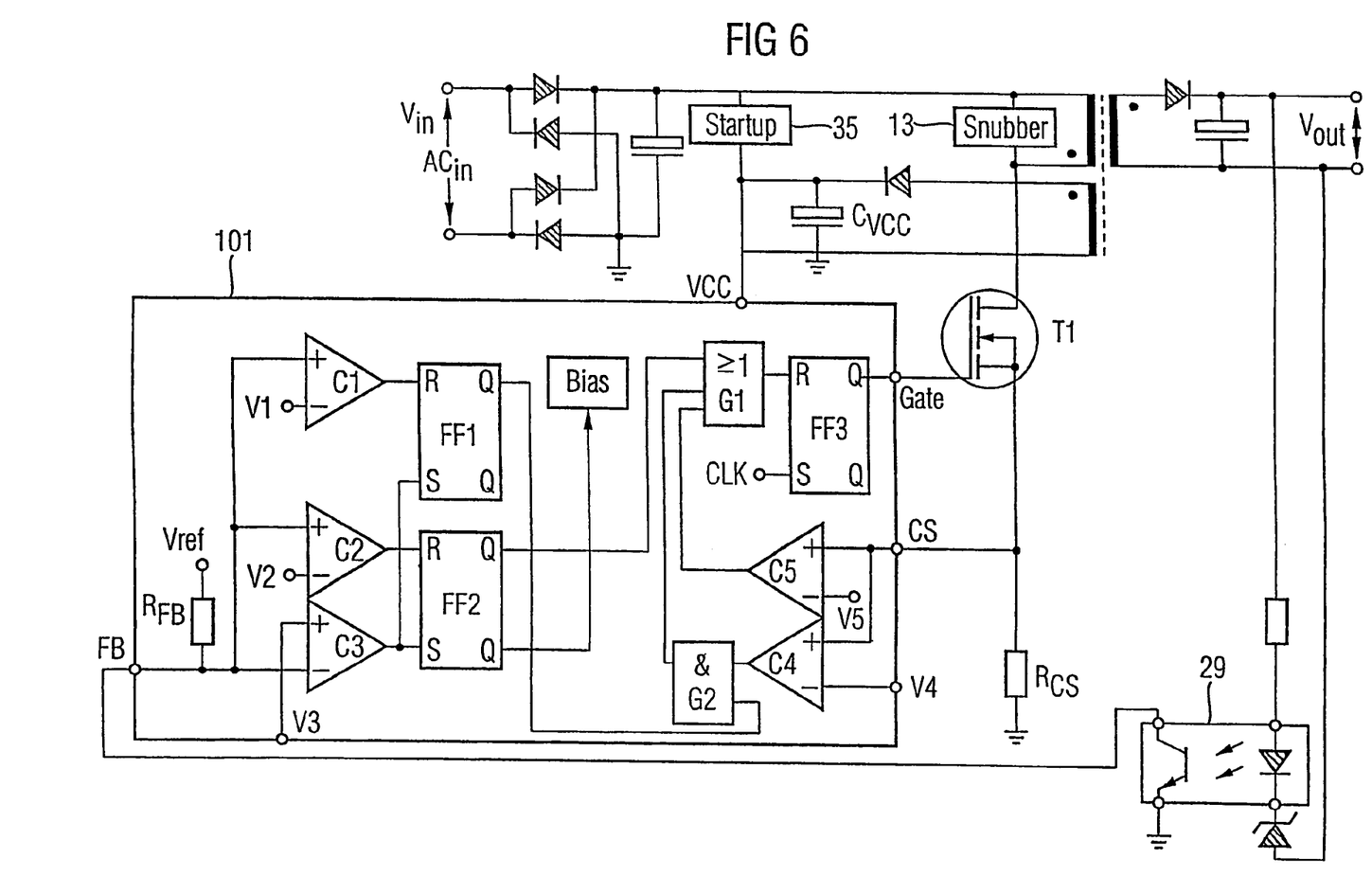
FIG. 6 shows a third embodiment of the invention.

FIG. 6 shows a modified implementation of the embodiment of FIG. 2 (a), differing only in that the threshold terminals of comparators C3 and C4 are connected to pins of the logic device which implements the control unit 101. This means that the thresholds V3 and V4 can be adjusted by external connected voltage references, or external connected resistors, thus determining the thresholds of C3 and C4.

Another possible variation of the embodiment of FIG. 2 (*a*) (or of FIG. 6) would be to connect a current source to FB in the place of the pull-up resistor RFB.

Figure 7:
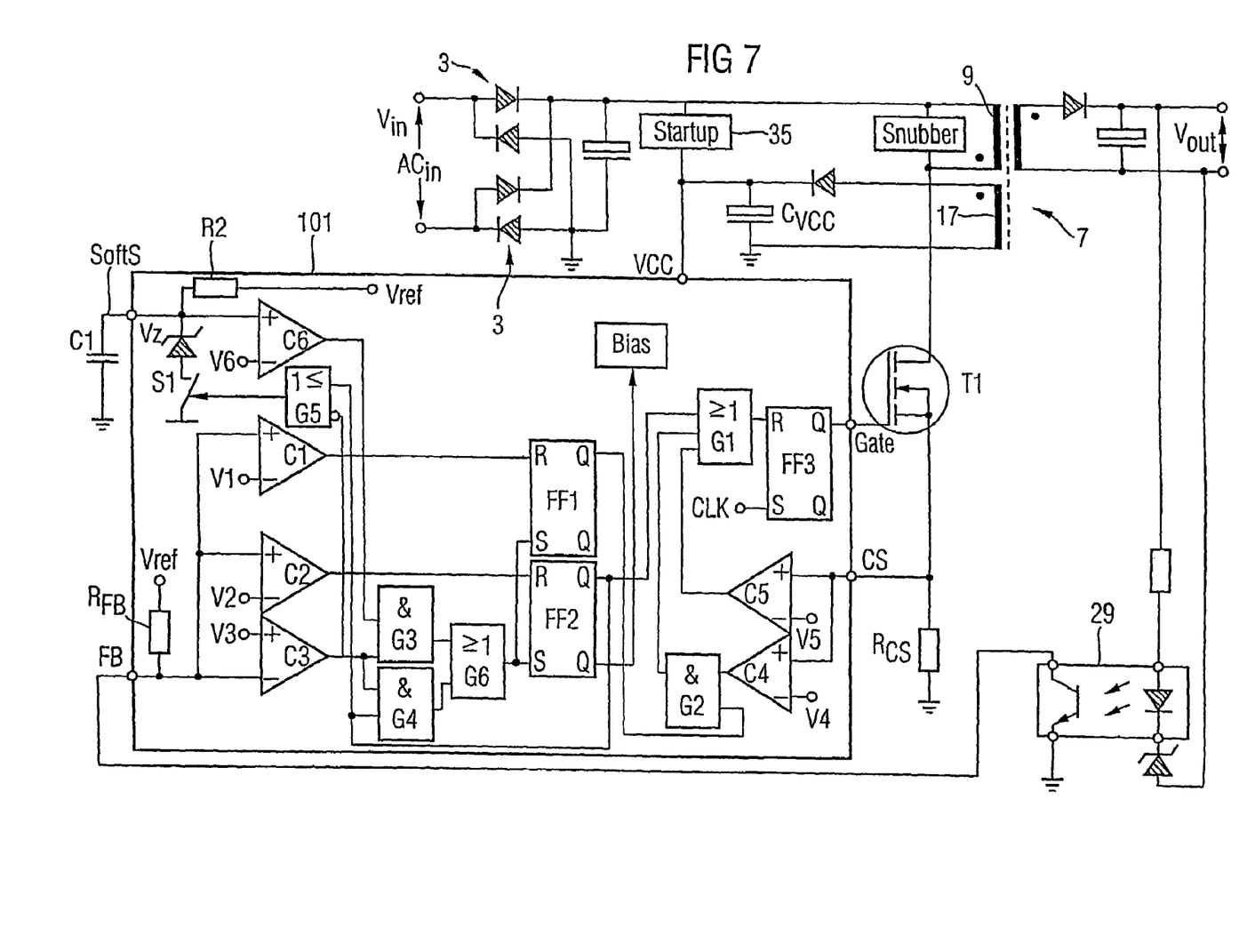
FIG. 7 shows a fourth embodiment of the invention.
Figure 8:
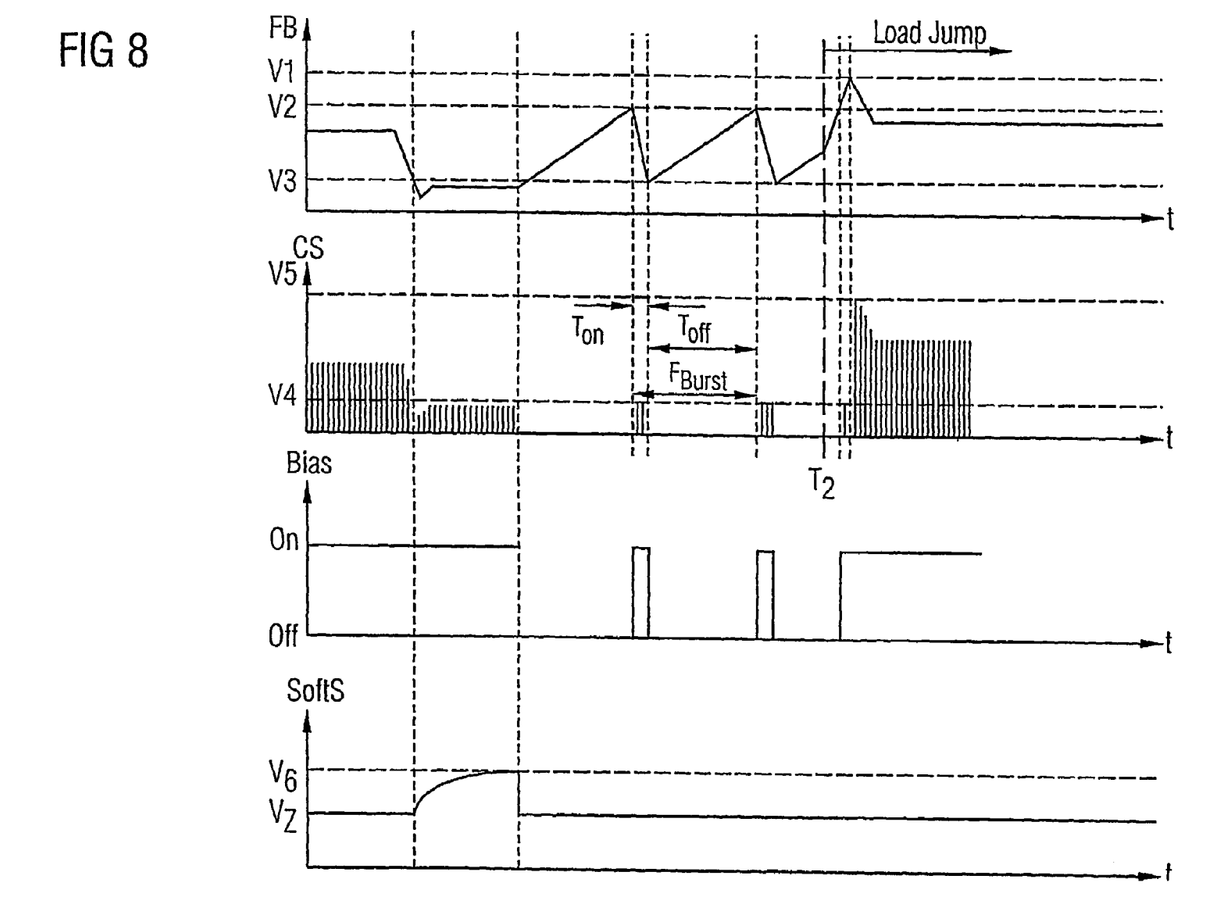
FIG. 8 shows waveforms observed in the embodiment of FIG. 7.

FIG. 7 shows a further embodiment of the invention, and FIG. 8 shows the associated signal curves. The embodiment of FIG. 7 permits an adjustable blanking time window. If the power converter is initially not in the burst mode and a sudden high load causes FB to fall below V3, the burst mode will not be entered provided that FB is below V3 for a time less than this blanking window.

The blanking time window is realised by the additional gates G3, G4, G5, G6 and a comparator C6, a switch S1, a Zener diode $V_z$ and an external capacitor C1. The gate G5 opens the switch S1 when a NAND of the output of FF2 and the inverse of C3 is one. The other gates have the functions shown in FIG. 7.

The capacitor C1 is charged by the internal pull-up resistor R2, which is connected to a reference voltage $V_{ref}$. If FB decreases below V3 while the output of FF2 is low, the output of C3 becomes high, so the switch S1 is opened by G5.

If FB remains below V3, then $V_{SoftS}$ increases until $V_6$. In this case G3 is released, and FF2 is set if FB is still below V3.

Conversely, if FB exceeds V3 in the when FF1 is not set, then S1 will be closed and $V_{SoftS}$ is clamped again at $V_z$, and the burst mode is not entered. Note that nevertheless the data in FF1 means that current limitation is applied.

If FF2 is set, then the burst mode is entered, and S1 is closed by FF2 and cannot be opened by C3. This ensures that the blanking time window function only works before the burst mode is entered.

G3, G4 and G6 collectively provide the function that the input to FF1 is only 1 if the outputs of the comparators C3 and C6 are both positive (indicating that the blanking time window has been passed) and/or the output of comparator C3 and of the FF2 itself are both positive (indicating that the FB is less than V3 and that the device is already inhibiting PWM, and thus is already in the burst mode).

Note that many variations of this embodiment are possible too. For example, in this embodiment, the pull-up resistor R2 can be replaced by an internal current source.

It is also possible to fully integrate the components which implement the blanking time window into the control unit 101, so that no pin is required, for connection to an external capacitor (i.e. C1 is located within the logic device which implements control unit 101). The time constant is internally fixed in this case. This can be realised by an internal capacitor which is charged by an internal current source. If a large time constant is required, a digital counter can provide it, the digital counter replacing the internal capacitor.

Thus, although the invention has been described above using particular embodiments, many variations are possible within the scope of the claims, as will be clear to a skilled reader.

The invention claimed is:

1. A switching mode power supply comprising:
   a transformer,
   a transistor operably coupled to switch current through a primary of the transformer, and
   a control unit comprising a first comparator and a second comparator configured to control the switching of the transistor to generate current pulses through the transformer, the control unit further configured to receive a signal related to power drawn by a load from a secondary side of the transformer and the first comparator configured to compare the signal with a first threshold level and the second comparator configured to compare the signal with a second threshold level, two threshold levels defining a range, the control unit configured to enable switching of the transistor in the case that a characteristic of the signal is outside the range in a first direction, and disabling switching of the transistor in the case that the characteristic of the signal is outside the range in a second direction, and
   a blanking window definition circuit configured to prevent the control unit from disabling switching of the transistor in the case that the signal is below the second lower threshold value for less than a preset period of time.

2. The switching mode power supply according to claim 1 wherein the characteristic of the signal is inversely related to power drawn by a load coupled to the secondary side, and wherein the control unit is further configured to enable switching when the characteristic of the signal is above a first threshold value, and disable switching of the transistor in the case that the characteristic of the signal is below a second lower threshold value.

3. The switching mode power supply according to claim 1 wherein the characteristic of the signal is directly related to the power drawn by a load coupled to the secondary side, and wherein the control unit is further configured to enable switching when the characteristic of the signal is above a first threshold value, and disable switching of the transistor in the case that the characteristic of the signal is below a second lower threshold value.

4. The switching mode power supply according to claim 1 further comprising a current limitation circuit arranged to receive a second signal indicative of the current through the primaiy of the transformer and to limit the current pulses if the second signal indicates that the current through the primary of the transformer is above a threshold value.

5. The switching mode power supply according to claim 4 further comprising a memory device for storing data indicating whether the switching mode power supply is operating in a first power supply mode, and arranged to enable the current limitation circuit only in the case that the power supply is operating in first power supply mode.

6. The switching mode power supply according to claim 5, wherein the memory device comprises a flip flop.

7. The switching mode power supply according to claim 6, wherein the current limitation circuit further comprises a logic gate coupled to receive a logic signal indicative of the power supply mode from the flip flop, the logic gate further coupled to receive an indication of whether the current through the primary of the transformer is above the threshold value.

8. A switching mode power supply comprising:
   a transformer,
   a transistor coupled to control the current through a primary of the transformer,
   a control unit configured to control switching of the transistor to generate current pulses in the transformer,
   a memory device for storing data indicating whether the switching mode power supply is operating in a burst mode, and
   a current limitation circuit arranged to receive a first signal indicative of the current through the primary of the transformer and to limit the current pulses responsive to a signal that is indicative of a condition in which both the first signal indicates that the current is above a burst mode threshold value and the memory device indicates that the switching mode power supply is operating in the burst mode.

9. The switching mode power supply according to claim 8 wherein the control unit is a single integrated circuit logic device.

10. The switching mode power supply according to claim 9 wherein the threshold value is on a value received at a pin input of the logic device.

11. The switching mode power supply according to claim 9 wherein the threshold value has a value determined by an internal reference voltage of the integrated circuit.

12. A method of operating a power supply, the power supply having a transformer, a transistor controlling the current through the primary of the transformer, and a control unit for controlling the switching of the transistor to generate current pulses in the transformer, the method including:
   a) receiving a signal related to power drawn by a load from a secondary side of the transformer and comparing the signal with two threshold levels, the two threshold levels defining a range, and
   b) enabling switching of the transistor in the case that the characteristic of the signal is outside the range in a first direction, and disabling switching to the transistor in the case that the characteristic of the signal is outside the range in a second direction; and
   c) preventing the control unit from disabling switching of the transistor in the case that the signal is below the second lower threshold value for less than a preset period of time.

13. The method according to claim 12, wherein the characteristic of the signal is inversely related to power drawn by a load coupled to the secondary side, and wherein step b) further comprises enabling switching when the characteristic of the signal is above a first threshold value, and disabling switching of the transistor in the case that the characteristic of the signal is below a second lower threshold value.

14. The method according to claim 12, wherein the characteristic of the signal is directly related to the power drawn by a load coupled to the secondary side, and wherein step b) further comprises enabling switching when the characteristic of the signal is above a first threshold value, and disabling switching of the transistor in the case that the characteristic of the signal is below a second lower threshold value.

15. The method according to claim 12, wherein the characteristic of the signal comprises a magnitude of the signal.

16. The method according to claim 12, further comprising:
   c) receiving a second signal indicative of the current through the primary of the transformer and limiting the current pulses if the second signal indicates that the current is above a threshold value.

17. The switching mode power supply according to claim 16 further comprising performing step c) only in the case that the power supply is operating in a first power supply mode of a plurality of power supply modes.

18. A method of operating a power supply having a transformer, a transistor controlling the current through a primary of the transformer, and a control unit for controlling the switching of the transistor to generate current pulses in the transformer, the method comprising:
   a) receiving a signal indicative of the current through the primary of the transformer, and
   b) limiting the current pulses responsive to a signal that is indicative of a condition in which both the signal indicates that the current is above a threshold value and the power supply is operating in a burst mode of a plurality of power supply modes.

19. A switching mode power supply comprising:
   a transformer,
   a transistor operably coupled to switch current through a primary of the transformer,
   a control unit configured to control the switching of the transistor to generate current pulses through the transformer, the control unit further configured to receive a signal from a secondary side of the transformer and compare the signal with the two threshold levels defining a range, the control unit configured to enable switching of the transistor in the case that a characteristic of the signal is outside the range in a first direction, and disabling switching of the transistor in the case that the characteristic of the signal is outside the range in a second direction,
   a current limitation circuit arranged to receive a second signal indicative of the current through the primary of the transformer and to limit the current pulses if the second signal indicated that the current through the primary of the transformer is above a threshold value, and
   a memory device for storing data indicating whether the switching mode power supply is operating in a first power supply mode, and arranged to enable the current limitation circuit only in the case that the power supply is operating in first power supply mode, wherein the memory device comprises a flip flop,
   wherein the current limitation circuit further comprises a logic gate coupled to receive a logic signal indicative of the power supply mode from the flip flop, the logic gate further coupled to receive an indication of whether the current through the primary of the transformer is above the threshold value.

* * * * *